United States Patent [19]

Turek et al.

[11] Patent Number: 4,893,824
[45] Date of Patent: Jan. 16, 1990

[54] HAND TRUCK FOR FILE CABINETS

[75] Inventors: John E. Turek, Hastings; Carl J. Schoberg, Zumbro Falls, both of Minn.

[73] Assignee: Liberty Diversified Industries, New Hope, Minn.

[21] Appl. No.: 242,323

[22] Filed: Sep. 9, 1988

[51] Int. Cl.$^4$ ............................................. B62B 1/14
[52] U.S. Cl. ................................ 280/47.27; 414/456; 414/490
[58] Field of Search ....................... 280/524, 47.24, 654, 280/47.2, 47.27, 47.28, 47.29; 414/490 X, 444, 445, 456 X, 454, 453; 280/5.24, 47.24, 654, 47.2

[56] References Cited

U.S. PATENT DOCUMENTS

| | | | |
|---|---|---|---|
| 659,108 | 10/1900 | Simmermaher | 414/456 |
| 1,490,361 | 4/1924 | Brown et al. | 414/456 |
| 1,512,454 | 10/1924 | Cade | 280/47.27 |
| 2,014,057 | 9/1935 | Rogers | 280/47.27 |
| 2,476,539 | 7/1949 | Fortin | 280/47.27 |
| 2,516,260 | 7/1950 | Schildmeier | 280/47.28 |
| 2,574,825 | 11/1951 | Guild | 280/47.27 |
| 2,797,832 | 7/1957 | Weinmann | 414/456 |

OTHER PUBLICATIONS

Gemini's Two-Sided Loose-Leaf Sales Catalog Magliner Buyer's Guide by Magline, Inc. of Pinconning, MI.
Photocopies of the Hand Trucks and Accessories Section of the July 1988 Loose-Leaf Catalog of Valey Craft, Inc. of Minnesota.
EZY-Rol Bale Truck Valley Craft Model 6115.

*Primary Examiner*—Charles A. Marmor
*Assistant Examiner*—Richard Camby
*Attorney, Agent, or Firm*—Moore & Hansen

[57] ABSTRACT

A hand truck comprising an upright frame having an upper frame section which is telescopingly attached to a lower frame section to permit the height of the frame to be adjusted and clamped into position. A short toe plate extends forwardly from the bottom of the lower frame section, and is slightly narrower than a standard file cabinet. A pair of wheels are conventionally mounted to the rear of the lower frame section. A retaining arm having a hooked end bracket is pivotally and slidably mounted to a crossbar of the upper frame section, such that the retaining arm may be pivoted in a vertical plane generally perpendicular to a plane defined by the front surface of the lower frame section, and slidingly extended forward and retracted backward relative to the crossbar. A spring-loaded clamp assembly serves for pivoting the retaining arm, and for restraining the arm against sliding movement. The upper frame section includes a pair of forwardly extending flanges which may be positioned against the top front of the file cabinet, with the retaining arm extending across the top of the filing cabinet so that the hooked end bracket engages the rear edge thereof. An inverted U-shaped handle bar extends rearward at an angle directly from the top of the upper frame section. The front of the frame sections are padded.

15 Claims, 2 Drawing Sheets

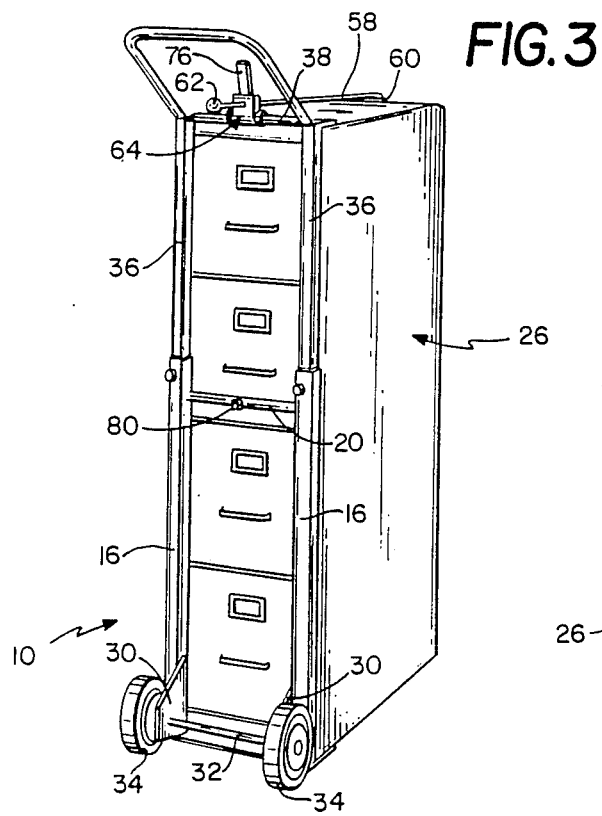
FIG. 3
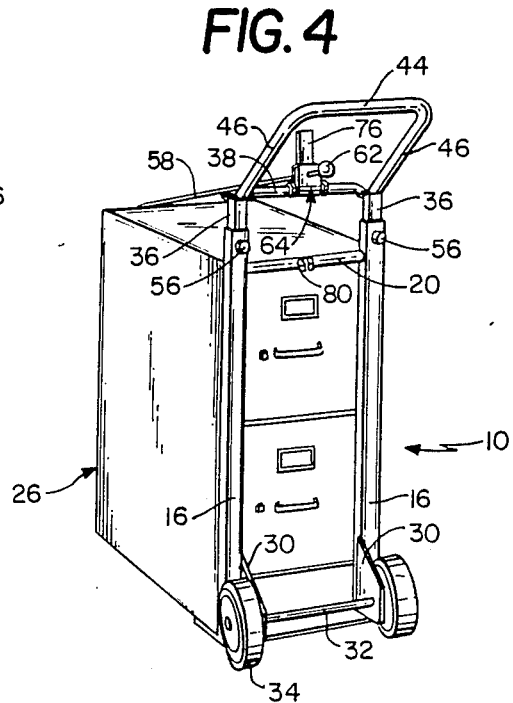
FIG. 4
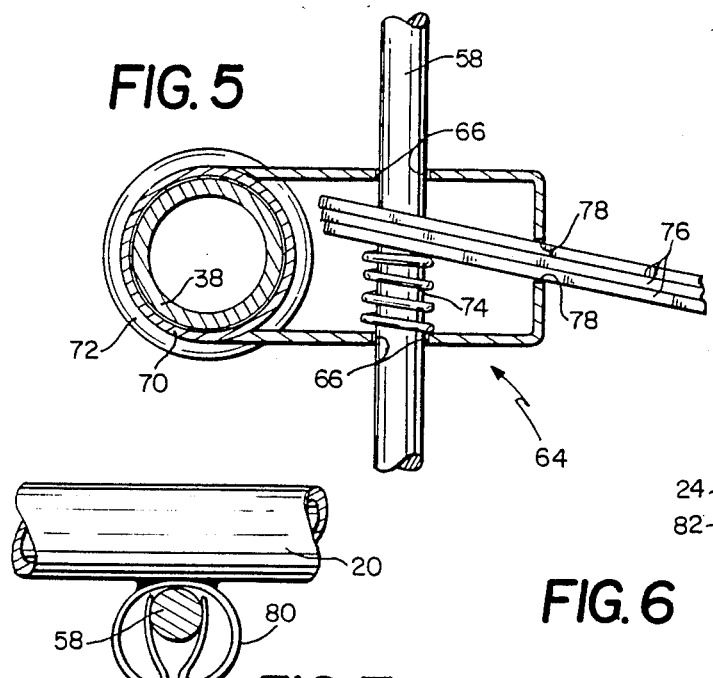
FIG. 5
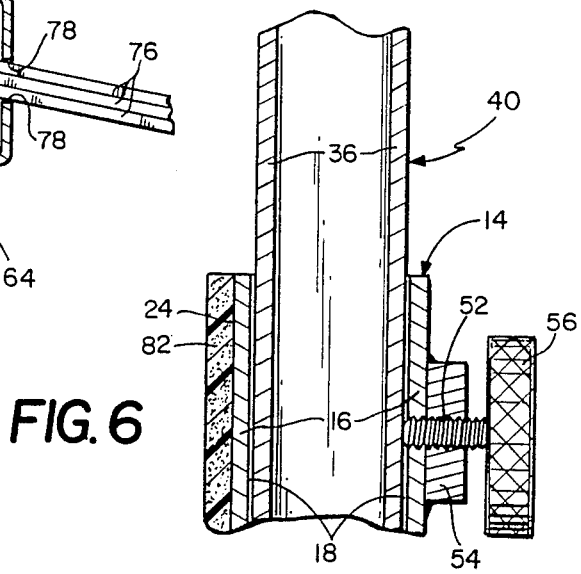
FIG. 6
FIG. 7

HAND TRUCK FOR FILE CABINETS

BACKGROUND OF THE INVENTION

This invention relates generally to hand trucks and dollies, and particularly to an upright two-wheeled hand truck for use in transporting office file cabinets.

Conventional hand trucks of many designs are known to the art, the most common being the upright, two-wheeled hand truck such as disclosed in U.S. Pat No. 4,420,166 to Law. Such hand trucks can take on any one of several configurations, such as those shown in U.S. Pat Nos. 3,927,898 to Weyrauch and 3,997,182 to Mortenson.

The general drawbacks involved in using an upright, two-wheeled hand truck are the difficulty in lifting or tilting the truck when raising a heavy load into a balanced position on two wheels, providing a suitably stable support for the load when on the truck, and restraining that load when the truck is being moved and the operator cannot hold the load onto the truck manually.

To overcome these problems, many specialized hand trucks have been developed to handle particular types or shapes of cargo. Features such as pivoting toe plate extensions for additional leverage and balance have been added, as well as modifications or attachments for using the hand truck in certain environments such as on stairways or to make those hand trucks convertible for use as four-wheeled carts or office trolleys. Examples of such features are shown in U.S. Pat Nos. 3,079,168 to Monroe; 3,997,182 to Mortenson; and 3,193,123 to Wouden.

In order to secure the load to the hand truck, various cables, ties, and elastic cords have been used. Such securing means are also common to luggage carts, bicycle racks, and trailers. In the case of large furniture or appliances, webbed straps with adjustable buckles are frequently used by movers, both to secure the load to the hand truck and also within the van or truck. Representative examples of such cords and webbing straps are shown in U.S. Pat. No. 4,175,769 to Kazmark and 4,591,183 to Gordon.

The use of a telescoping or adjustable handle having a variable length has also proven desirable in some applications, representative examples of such hand trucks being shown in U.S. Pat. Nos. 4,286,796 to Esposito and 4,570,953 to McPeak, and similar adjustable handles can also useful in collapsible luggage carts such as those shown in U.S. Pat. Nos. 4,040,642 to David or 3,827,707 to Bierman.

One particular area which has received much attention is the handling of barrels, drums, and similar cylindrical containers. Hand trucks having curved back frames to permit the drums to rest further back on the toe plate to increase leverage are well known, as are various hand trucks and fork lifts which carry the drums in a reclining or horizontal position.

Another development that has proven useful with handling drums is to place a clasp or claw on the frame of the hand truck which clips over and engages the upwardly projecting circumferential top rim of the drum, and prevents the drum from tipping forward when the hand truck is pivoted onto its wheels. Several various designs of these clasps or clamps are shown in U.S. Pat. Nos. 2,014,057 to Rogers; 2,447,300 to Williams; 2,797,832 to Weinmann; and 2,612,379 to Vogel. These clamps or clasps are generally pivotably mounted on and close to the main back frame of the hand truck, spring loaded, and may be adjusted vertically along the frame or a track to accommodate drums of differing heights. A similar type of clip structure is also disclosed in U.S. Pat. No. 2,693,968 to Bateman, although its purpose is to retain the platform section of a coin operated baggage cart in its folded position.

Of particular interest are U.S. Pat. Nos. 1,490,361 to Brown and 2,710,106 to Hanson. The Brown '361 and Hanson '106 patents each disclose hand trucks specially designed for use with drums or barrels, and have longer hooks for retaining a load against the rear frame.

In the Brown '351 patent, a "chime-hook" comprised of a flat bar with a curled, depending hook at each end is used to retain a load on the hand truck. The chime hook is slidably and rotatably mounted on a rod, the rod passing vertically through an aperture in the bar and through a hub or guide block which allows the height of the chime bar to be adjusted along the rod. The bar may then be pivoted over the rear edge of the drum, and lowered to engage the rim thereof.

In the Hanson '106 patent, the hook is longer and formed from a straight rod bent at one end to form a hook, and is normally stowed in an inoperable position with the hook end inserted through a hole in the angle irons of the frame. For use, the rod is removed from its stowed position and inserted through one of several central slots in the angle irons, with cross pins extending perpendicularly from the mid-portion of the rod being aligned axially with the slots. When the hook is in position, the rod is rotated so that hook end depends downwardly and catches the front edge of the load, and the cross pins depend downwardly and perpendicular to the slots so as to be engaged between the angle irons, thereby retaining the rod from forward or backward movement.

These hand truck designs, however, have failed to solve several of the problems or drawbacks with attempting to use a hand truck with a load such as a file cabinet. File cabinets are often placed in close contact side-by-side and against side or back walls, making them difficult to jockey, and even shorter file cabinets may contain extremely heavy loads of papers and files. Because file cabinets are often transferred without removing the contents, it is desirable to have a method of securing the file cabinet to the hand truck while it is in place between other file cabinets or a wall, lifting that file cabinet from this restricted position, and transporting the file cabinet without resecuring the file cabinet to the hand truck or placing additional padding to protect the front of the file cabinet.

BRIEF SUMMARY OF THE INVENTION

It is therefore one object of this invention to design a hand truck which may be used to lift fully loaded file cabinets from a restricted position between other file cabinets or a wall.

It is a related object of this invention to design the above hand truck such that the file cabinet may initially be secured to the hand truck and lifted without requiring the user to reach to the rear of the file cabinet or resecure the file cabinet to the hand truck for transporting after it has been removed from the restricted position.

It is an additional object of this invention to design the above hand truck such that it may lift the file cabinets from the front end rather than the rear end, and such that file cabinets of varying heights and numbers of drawers may be transported.

It is yet another object of this invention to design the above hand truck such that it may alternately be used for other types of loads, but remains constantly ready for the specialized use in lifting and transporting file cabinets without complicated adjustments or modifications of the components, and such that the elements of the hand truck do not interfere with this normal use.

Briefly described, the hand truck of this invention comprises an upright frame having an upper frame section which is telescopingly attached to a lower frame section to permit the height of the frame to be adjusted and clamped into position. A short toe plate extends forward from the bottom of the lower frame section, and is slightly narrower than a standard file cabinet. A pair of wheels are conventionally mounted to the rear of the lower frame section. A retaining arm having a hooked end bracket is pivotally and slidably mounted to a crossbar of the upper frame section, such that the retaining arm may be pivoted in a vertical plane generally perpendicular to a plane defined by the front surface of the lower frame section, and slidingly extended forward and retracted backward relative to the crossbar. A spring-loaded clamp assembly serves both as the means for pivoting the retaining arm, and for restraining the arm against sliding movement. The upper frame section includes a pair of forwardly extending flanges which may be positioned against the top front of the file cabinet, with the retaining arm extending across the top of the filing cabinet so that the hooked end bracket engages the rear edge thereof. An inverted U-shaped handle bar extends rearward at an angle directly from the top of the upper frame section. The front of the frame members are padded.

BRIEF DESCRIPTION OF THE DRAWINGS

FIG. 3 is a rear perspective view of the hand truck of FIG. 1 adjusted to a greater height with a four-drawer file cabinet secured thereto;

FIG. 4 is a rear perspective view of the hand truck of FIG. 1 adjusted to a lesser height with a two-drawer file cabinet secured thereto;

FIG. 5 is a cross section view of the spring-loaded retaining arm clamp assembly of the hand truck of FIG. 1 taken through line 5—5 of FIG. 2;

FIG. 6 is a cross section view of the frame section clamping assembly of the hand truck of FIG. 1 taken through line 6—6 of FIG. 2; and FIG. 7 is a partial cross section view of the retaining arm and lower crossbar of the hand truck of FIG. 1 taken through line 7—7 of FIG. 2.

DESCRIPTION OF THE PREFERRED EMBODIMENT

Figures 1, 2:
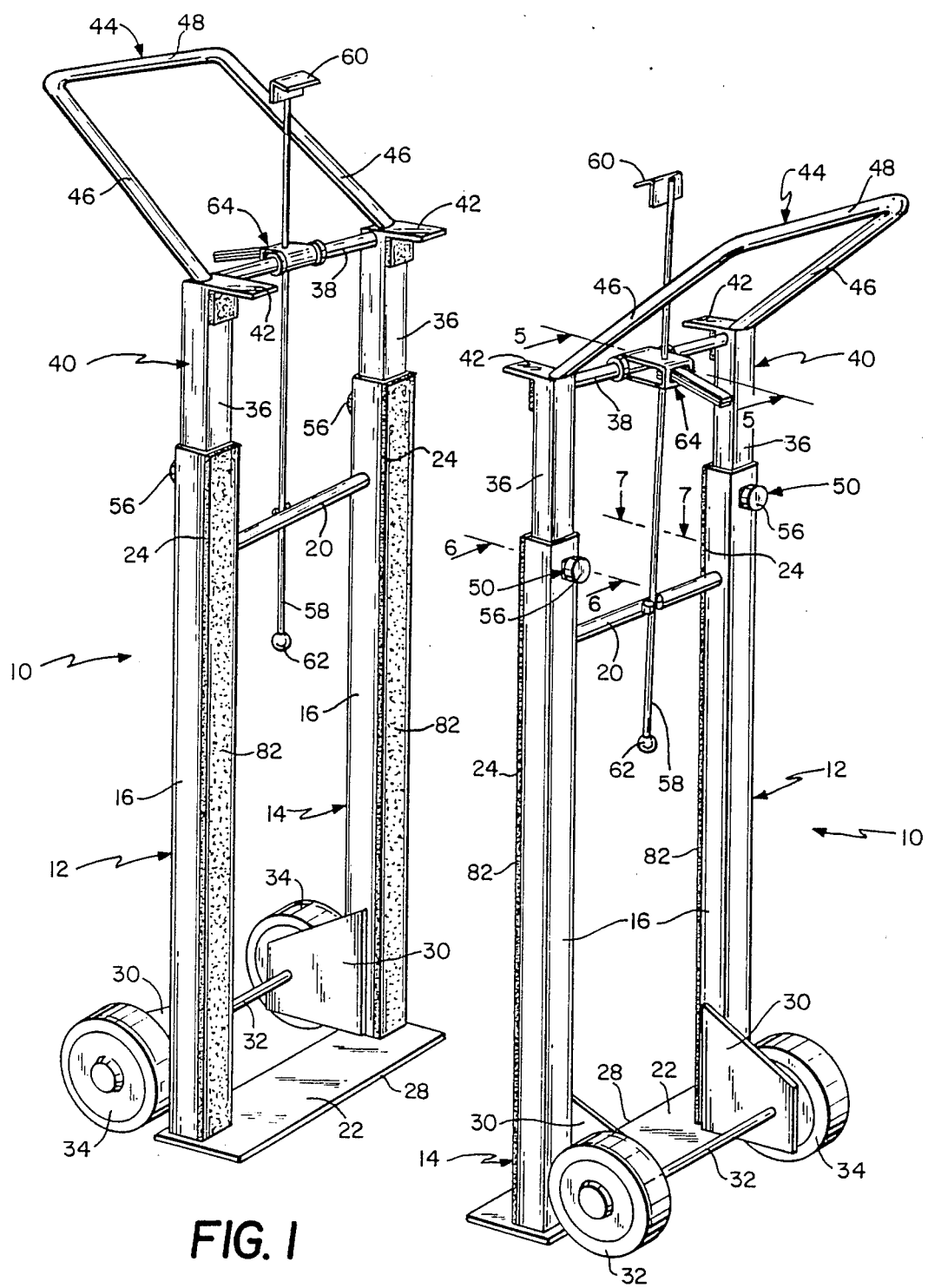
FIG. 1 is a front perspective view of the hand truck of this invention.
FIG. 2 is a rear perspective view of the hand truck of FIG. 1.

The hand truck of this invention is shown in FIGS. 1–7 and referenced generally therein by the numeral 10.

Referring particularly to FIGS. 1 and 2, the hand truck 10 can be seen to comprise an upright frame 12 having a lower frame section 14 consisting of a pair of parallel, spaced-apart hollow vertical side frame members 16 having a generally square cross section and defining a generally square longitudinally extending bore 18 as shown in FIG. 6. Spanning between the lower side frame members 16 proximate to the top ends thereof is a lower crossbar 20 which has a generally circular cross section and is fixedly connected at each end thereof to one of the lower side frame members 16.

A short toe plate 22 spans the lower side frame members 16 proximate to the bottom ends thereof, with the toe plate 22 preferably being fixedly connected in abutting contact to the bottom ends of the lower side frame members 16. The lower side frame members 16 each have a front planar surface 24 as shown particularly in FIG. 6, with the front planar surfaces 24 of the lower side frame members 16 together defining a generally vertical or upright forward facing retention plane against which a load such as a file cabinet 26 may be rested. The toe plate is preferably slightly narrower than the width of a standard metal file cabinet, a 14½" width having proven suitable, and the front edge 28 of the toe plate 22 preferably extends forwardly from the vertical retention plane only a distance of approximately 2"–4", and such that the top planar surface of the toe plate 22 is generally perpendicular to the retention plane. It should be noted that the hand truck 10 will operate most suitably with a generally rectangular load such as a file cabinet 26 having a top surface and a bottom surface and a height measured therebetween, as well as a front side having drawers and a back side, as shown in FIGS. 3 and 4.

Extending rearward from and fixedly connected in abutting contact to the inside surfaces of the lower frame members 14 are a pair of generally trapezoidal wheel mounting flanges 30, each wheel mounting flange 30 defining an aperture through which an axle 32 may be received, with a pair of wheels 34 rotatably attached to the ends of the axle 32 so that the bottom point of the wheels 34 is approximately flush with the bottom planar surface of the toe plate 22.

Slidably and telescopingly received within the longitudinally extending bore 18 of each of the lower side frame members 16 is a top side frame member 36 similarly having a generally square cross section approximately equal to the bore 18 of the lower side frame members 16. The top side frame members 36 are similarly spanned by an upper crossbar 38 which extends completely across between the top side frame members 36 and is fixedly connected thereto at each end.

The top side frame members 36 and upper crossbar 38 together define an upper frame section 40 which is carried on the lower frame section 12 thus permitting the height of the hand truck 10 to be selectively adjusted.

Extending forwardly from the top end of each top side frame member 36 is a generally flat flange member 42 which may be positioned against the top surface of a file cabinet 26 near the front edge thereof, as shown in FIG. 3. Each flat flange member 42 should extend forwardly a distance relative to the retention plane approximately equal to the front edge 28 of the toe plate 22.

Extending rearward from the top end of each top side frame member 36 is an inverted, U-shaped handle member 44 consisting of a pair of upwardly angled tubular legs 46 and a tubular handgrip segment 48 extending therebetween. The handle member 44 preferably extends directly back and upward from the top end of each of the top side frame members 36 at an angle of 45 or less relative to horizontal, with the handle member 44 being relatively straight and unbent.

Referring particularly to FIG. 6, it may be seen that the height of the hand truck 10, or the position of the upper side frame members 36 relative to the lower frame members 16 or the handle member 44 relative to the toe plate 22, is accomplished using a pair of frame section clamping assemblies 50 each comprising a threaded shaft 52 which extends through a similarly threaded aperture in a guide block 54 fixedly attached to the rear face of the lower side frame member 16, as well as through the lower side frame member 16. A knob 56 attached to the rear end of the shaft 52 permits a user to forcibly rotate the front end of the shaft 52 into positive contact with the rear face of the upper side frame members 36, to releasably secure or clamp the upper frame section 40 at any one of an unlimited number of selected heights.

Referring again to FIG. 1 and 2, it may be seen that the and truck 10 includes a grasping or retaining arm 58 having an L-shaped hook or end bracket 60 or similar gripping means fixedly attached to the distal end thereof, and a generally spherical knob 62 attached to the opposing end. The retaining arm 58 is pivotably mounted on the upper crossbar 38 of the upper frame member 40 by a spring-loaded retaining arm clamp assembly 64. As shown in FIG. 5, the retaining arm 58 extends through two aligned apertures 66 in the top and bottom walls of a thin-walled, generally rectangular U-shaped housing 68. The housing 68 is fixedly attached to a generally cylindrical collar section 70 which circumscribes and may rotate freely on the upper crossbar 38. The collar section 70 is held in a generally central position on the upper crossbar 38 by a pair of retaining rails 72 disposed on each side of the collar section 70 and fixedly attached to the upper crossbar 38. Within the housing 68 and encircling the retaining arm 58 is a coil spring 74 and three clamping bars 76 arranged in parallel abutting contact. Each clamping bar 76 has a generally circular aperture of slightly greater diameter than the retaining arm 58 through each of which the retaining arm 58 is sequentially inserted. The clamping bars 76 are pivotally mounted and each extend rearward and outward through a slot 78 in the rear wall of the housing 68 to the exterior region thereof, with the slot 78 in the housing 68 maintaining the clamping bars 76 in substantially parallel alignment. The spring 74 continuously contacts and presses against one planar side of one of the clamping bars 76, to urge the end of each of those clamping bars 76 which surrounds the retaining arm 58 upwardly and out of alignment with the slot 78 so that the edges of the apertures in the clamping bars 76 contact and engage the retaining arm 58 to prevent it from moving slidably relative to the clamping bars 76, housing 68, and upper frame member 40. As such, the clamping bars 76 are urged away from first position having a perpendicular orientation to the length of the retaining arm 58 by the springs toward a second position whereat the clamping bars 76 are substantially non-perpendicular with the length of the retaining arm 58, and the clamping bars 76 may be manually pivoted to the first generally perpendicular position by applying pressure to the portions of the clamping bars 76 extending to the exterior of the housing 68.

The retaining arm 58 may therefore be pivoted in a vertical plane generally perpendicular to the plane defined by the front surfaces of the lower side frame members 16 by rotating the collar section 70 of the retaining arm clamp assembly 64 around the upper crossbar 38. While the retaining arm 58 may be considered to pivot about an axis proximate to the upper crossbar 38, it does not actually pivot, but rather travels in a generally planetary path around the upper crossbar 38 with the retaining arm 58 being oriented tangential to that path.

The retaining arm 58 may also be slidingly extended forward and retracted backward in a longitudinal direction parallel with the direction of extent of the retaining arm 58 through the housing 68 and thereby move longitudinally relative to the upper crossbar 38, by exerting an upward pressure on the portion of the clamping bars 76 extending out of the housing 76 to push or pivot the portion of the clamping bars 76 contained within the housing 68 and surrounding the retaining arm 58 toward and against the spring 74, thereby releasing the pressure exerted by the clamping bars 76 on the retaining arm 58, thus allowing the retaining arm 58 to slide through the apertures in the clamping bars 76.

When pivoted to the fully upright position as shown in FIGS. 1 or 2, the lower or rear end of the retaining arm 58 may be engagingly received within a spring clip 80 which is fixedly attached to the lower crossbar 20.

In order to protect the front surface of the file cabinets 26 from damage, the front surfaces of the lower side frame members 16, as well as the bottom surfaces of the flat flange members 42 and a portion of the front surfaces of the upper side frame members 36 proximate thereto, may be covered with a padding material 82 such as foam, rubber, or felt padding. The L-shaped hook or end bracket 60 may also preferably have a rubber coating or other padding to similarly protect the file cabinet 26.

In operation, the front edge 28 of the toe plate 22 may be slidingly engaged beneath the front edge of a file cabinet 26 with the front side of the file cabinet closely confronting the retention plane of the frame 12. In order to accommodate file cabinets 26 of different heights, the knobs 56 of the frame section clamping assemblies 50 may be turned to loosen the pressure applied by the threaded shaft 52 against the upper side frame members 36, thereby allowing the upper side frame members 36 to be slidably and telescopingly raised or lowered within the lower side frame members 14 until the flat flanges members 42 are in abutting parallel contact with the top front surface of the file cabinet 26. The hand truck 10 is preferably adjustable between heights of at least 33" to 62" to accommodate standard two-drawer and four-drawer file cabinets 26, although in the case of shorter file cabinets 26 the flat flange members 42 may remain disposed above the top surface of the file cabinet 26 as shown in FIG. 4.

The upper crossbar 38 should be disposed at a height above the top of the file cabinet 26 so that the retaining arm 58 may be disengaged from the clip 80 and the pivoted forwardly and downwardly extend across the top of the filing cabinet so that the depending end of the L-shaped hook or end bracket 60 engages the rear edge of the file cabinet 26.

The clamping bars 76 of the retaining arm clamping assembly 64 may be released as described above to permit the retaining arm 58 to be slid manually forward or backward to align the depending end of the L-shaped hook or end bracket 60 with the rear edge of the file cabinet 26.

The hand truck 10 may then be pivoted backwards on the wheels 34 to lift the file cabinet 26 from its position, with the file cabinet 26 and hand truck 10 being wheeled backward to remove the file cabinet 26 from a restricted position, and then wheeled forwardly for transporting the file cabinet 26.

The file cabinet 26 may be completely repositioned using the hand truck 10, and then pivoted downwardly to rest on floor or other base, with the retaining arm 58 being disengaged from top back edge of the file cabinet 26 by again pressing the clamping bars 76 and releasing the clamping arm 58 so that the distal end may be slid forwardly and then pivoted upwardly into a generally vertical position, with the retaining arm 58 secured in the clip 80.

While the preferred embodiment of the above hand truck 10 has been described in detail above with reference to he attached drawing figures, it is understood that various changes and adaptations may be made in the hand truck 10 without departing from the spirit and scope of the appended claims.

What is claimed is:

1. A hand truck for transporting an article such as a file cabinet, said article having a top surface and a bottom surface and a height measured therebetween, said article further having a front side and a back side and a depth measured therebetween, said hand truck comprising:

a generally upright frame, said frame having a top end and a bottom end and a height measured therebetween, a pair of opposing sides and a crossbar extending therebetween, said frame further defining a generally upright forward facing retention plane;

a handle section, said handle section being connected to said frame proximate to the top end thereof;

a toe plate, said toe plate connected to and extending forwardly from said frame proximate to the bottom thereof, said toe plate having a top planar surface oriented generally perpendicular to said retention plane;

a pair of wheels, each said wheel being rotatably mounted to one of said opposing sides of said frame proximate to the bottom thereof, said wheels extending generally rearwardly from and said frame;

a retaining arm, said retaining arm having a distal end including a gripping means connected thereto, said retaining arm being mounted on said frame for pivotal movement relative to said frame such that said distal end of said retaining arm may be pivoted in a vertical plane generally perpendicular to said retention plane, said retaining arm also be mounted for longitudinal sliding movement relative to said frame simultaneously with said pivotal movement; and a clamping assembly, said clamping assembly being connected to said frame, said retaining arm being connected to said clamping assembly, said clamping assembly including a collar mounted on said crossbar for rotational movement about said crossbar, a housing connected to and carried on said collar for rotational movement about said crossbar, said housing further including at least one aperture through which said retaining arm is slidably inserted, a clamping means, said clamping means being connected to said housing and capable of exerting a clamping force upon said retaining arm to prevent said retaining arm from moving slidably through said aperture in said housing and longitudinally relative to said crossbar, and means for selectively releasing said clamping means, whereby the toe plate of the hand truck may be inserted under the article with the front side of the article closely confronting the retention plane of the frame, and the retaining arm may be pivoted forwardly and downwardly and slidably moved forwardly relative to the frame so that the distal end of the retaining arm extends across the top surface of the article and the gripping means engages the back side of the article to retain and secure the article in contact with the toe plate and the retention plane when the hand truck is tilted backward onto the wheels.

2. The hand truck of claim 1 wherein the retaining arm has a length, and wherein said clamping means comprises:

at least one clamping bar, said clamping bar defining an aperture through which the retaining rod extends, said clamping bar being pivotally mounted on said housing such that said clamping bar may pivot between a first position generally perpendicular to the length of the retaining arm and a second position at a substantially non-perpendicular angle relative to the length of the retaining arm; and spring means, said spring means being mounted on said housing such that said spring means urges said clamping bar toward said second position at a substantially non-perpendicular angle relative to the length of the retaining arm to thereby clamp the retaining arm against longitudinal sliding movement relative to the housing, and such that said clamping force may be selectively released by pivoting said clamping bar to said first position generally perpendicular to the length of the retaining arm.

3. The hand truck of claim 2 wherein the number of the bars is three, each of the bars being in generally parallel abutting contact with at least another one of the bars.

4. The hand truck of claim 1 wherein the frame comprises an upper frame section and a lower frame section, said upper frame section being movably mounted to and carried on said lower frame section such that said upper frame section may be moved upwardly and downwardly relative to said lower frame section when the frame is in a generally upright position, and such that said upper frame section may be releasably secured in a selected position relative to said lower frame section, whereby the h eight of the frame may be altered.

5. The hand truck of claim 1 wherein the handle section has a pair of generally parallel spaced apart legs, each of said legs being connected by a handgrip segment, said legs each being connected to the frame proximate to the top end thereof and extending rearwardly from the frame.

6. The hand truck of claim 4 wherein the upper frame section includes a pair of flanges, each said flange being connected to and extending forwardly from said upper frame section proximate to the top end of the frame, such that the flanges may be disposed over and in abutting contact with the top surface of the article adjacent the front side thereof when the article is secured to the hand truck.

7. The hand truck of claim 6 wherein the toe plate has a front edge which extends a distance forwardly measured from the retention plane, and wherein the flanges extend forwardly a distance measured from the retention plane approximately equal to the distance the front edge of the toe plate extends forwardly from the retention plane.

8. The hand truck of claim 4 wherein the lower frame section includes a pair of generally parallel spaced apart lower side frame members and the upper frame section includes a pair of generally parallel spaced apart upper side frame members, said upper side frame members being connected by an upper crossbar, each said upper side frame member being movably mounted to and carried on one of said lower side frame members.

9. The hand truck of claim 8 wherein the retaining arm is pivotably and slidably connected to said upper crossbar.

10. The hand truck of claim 8 wherein each of the upper side frame members is mounted to and carried on an opposing one of the lower side frame members in a telescoping relation thereto.

11. The hand truck of claim 8 wherein each of the lower side frame members defines a bore extending longitudinally therethrough, one of the upper side frame members being at least partially and slidably received within said bore of the lower side frame members.

12. The hand truck of claim 1 wherein the toe plate has a width, said width being less than fifteen inches.

13. The hand truck of claim 5 wherein the legs of the handle section are generally straight, and wherein the legs of the handle section extend rearwardly from the frame at an angle generally equal to or less than forty five degrees relative to a horizontal line when the frame is in a vertical upright position.

14. The hand truck of claim 5 wherein the handgrip segment of the handle section connecting the legs is disposed more than eight inches rearwardly measured rom the top end of the frame.

15. The hand truck of claim 1 further comprising:
a clip, said clip being connected to said frame and positioned so as to receive at least a portion of the retaining arm when the retaining arm is pivoted to a generally upright position generally parallel with said retention plane, said clip releasably securing the retention arm against pivotal and sliding movement.

* * * * *